US006775089B1

(12) United States Patent
Bonin et al.

(10) Patent No.: US 6,775,089 B1
(45) Date of Patent: Aug. 10, 2004

(54) ELECTROSTATIC SLIDER FLY HEIGHT CONTROL

(75) Inventors: Wayne A. Bonin, North Oaks, MN (US); Zine-Eddine Boutaghou, Vadnais Heights, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 374 days.

(21) Appl. No.: 10/015,163

(22) Filed: Dec. 11, 2001

Related U.S. Application Data

(60) Provisional application No. 60/256,208, filed on Dec. 15, 2000.

(51) Int. Cl.[7] .............................................. G11B 21/02
(52) U.S. Cl. ....................................................... 360/75
(58) Field of Search .......................................... 360/75

(56) References Cited

U.S. PATENT DOCUMENTS

| 5,839,193 A | 11/1998 | Bennin et al. ............. 29/896.9 |
| 5,844,751 A | 12/1998 | Bennin et al. .............. 360/104 |
| 5,856,896 A | 1/1999 | Berg et al. ................... 360/104 |
| 5,864,445 A | 1/1999 | Bennin et al. .............. 360/104 |
| 5,943,189 A | 8/1999 | Boutaghou et al. ......... 360/103 |
| 5,991,114 A | 11/1999 | Huang et al. ................. 360/75 |
| 6,005,736 A | * 12/1999 | Schreck ....................... 360/75 |

OTHER PUBLICATIONS

Lin, C. and Massaro, J., IBM Technical DIsclosure Bulletin, Electrostatically Loaded Slider Bearing, vol. 12, No. 7, Dec. 1969.

* cited by examiner

Primary Examiner—David Hudspeth
Assistant Examiner—Mitchell Slavitt
(74) Attorney, Agent, or Firm—Kinney & Lange, P.A.

(57) ABSTRACT

A slider for use in a disc drive system that is comprised of a trailing edge, a connection for applying a voltage to the slider, an actuation surface for providing electrostatic control, and a recessed area between the trailing edge and the actuation surface. Applying voltage to the slider provides a method for controlling fly height between the trailing edge of the slider and the disc.

22 Claims, 5 Drawing Sheets

ELECTROSTATIC SLIDER FLY HEIGHT CONTROL

CROSS-REFERENCE TO RELATED APPLICATION(S)

This application claims priority from provisional application serial No. 60/256,208, filed on Dec. 15, 2000, and entitled "Electrostatic Slider Fly Height Control" by Wayne Allen Bonin and Zine-Eddine Boutaghou, which is herein incorporated by reference.

BACKGROUND OF THE INVENTION

The present invention relates to a disc drive system. In particular, the present invention relates to an improved slider design that provides increased control of slider fly height in a disc drive system.

Disc drive systems are well known in the art and comprise several discs, each disc having concentric data tracks for storing data. The discs are mounted on a spindle motor, which causes the discs to spin. As the discs are spun, a slider is positioned above a data track on the disc by moving an actuator arm on which the slider is suspended. The actuator arm is moved using a large scale actuator motor, such as a voice coil motor. A transducing head carried by the slider is used to read from or write to a data track on the disc.

In a typical disc drive system, as the disc rotates, the disc drags air in a "wind" along the surface of the slider. Due to this windage, the slider lifts and "flies" a small distance above the disc surface. The distance between the slider and the rotating disc is termed the "fly height".

The amount of data that can be stored on a disc is a measure of the areal recording density of the disc. In most applications, such as desk top or lap top computers, there is a continual desire to increase areal recording density on discs. Areal recording density is inversely proportional to the fly height of the transducing head. Therefore, there is a constant pressure to minimize and control fly height of the transducing head to afford higher areal recording density.

There have been many attempts to minimize and control fly height, to varying degrees of success. Often, attempts at minimizing fly height are very expensive to manufacture and do not address all of the variables that adversely affect fly height. These variables include atmospheric pressure, curvature or roughness of the disc surface, mechanical shock and vibration, and variation in the aerodynamics of the slider due to change in the orientation and position of the slider relative to the rotating disc. Fly height of the slider is also affected by thermal pole tip recession, which manifests itself in sliders constructed of commonly used materials such as silicon or an $Al_2O_3$/TiC composite as a protrusion of the pole tip at higher temperatures due to differential thermal expansion. The protrusion of the pole tip can reduce the fly height margin to below safe levels and possibly even cause catastrophic failure of the disc drive system.

Traditionally, several methods of fly height control have been employed. For example, a preload force is often applied to the slider to counteract the air bearing force. The magnitude of the preload force is designed to be in equilibrium against the air bearing force at a desired fly height, positioning the transducing head as close as reliably possible to the moving disc surface. Attempts have also been made to minimize and control fly height by adjusting the aerodynamic properties of the actuator arm and by adjusting the geometry of the slider assembly. Other attempts involve the use of micro-actuators to provide fine position control of the slider relative to the disc.

In the past, electrostatic fly height control has also been proposed. Applying a voltage to the slider creates an electrostatic potential in the slider which results in an attractive force between the slider and the disc. However, traditional methods of electrostatic fly height control have had only limited success. The slider becomes increasingly difficult to control as fly height is decreased because the electrostatic attractive force between the slider and the disc increases very rapidly as more voltage is applied. As a result, typical disc drive systems employing electrostatic control of fly height can only reduce fly height in a stable manner by about 30%. Applying more voltage to reduce fly height beyond that point risks a sudden and disastrous crash, with the slider suddenly being forced into full contact with the disc.

Thus, there is a need in the art to increase stability and control of the slider at low fly heights, thereby increasing areal recording density and increasing the performance of the disc drive system.

BRIEF SUMMARY OF THE INVENTION

The present invention is a design for a slider for use in a disc drive system and a method of electrostatically controlling the slider. The slider may be constructed of conductive or semi-conductive material. The slider contains a connection for applying a voltage and an actuation surface for providing electrostatic control. The slider also contains a transducing head, which may be located near the trailing edge of the slider and which may be encased in an insulating layer. The slider also contains a recessed area between the trailing edge and the actuation surface.

A voltage is applied to the slider that affects fly height of the slider by creating an electrostatic attraction force between the slider and the disc. By controlling voltage applied to the slider, it is possible to control the fly height as well, based on the electrostatic attraction between the slider and the disc. As voltage is increased, the electrostatic attraction between the slider and the disc increases, decreasing the fly height of the slider. The recessed area on the slider causes the majority of electrostatic attractive force between the slider and the disc to generate away from the trailing edge. As a result, the recessed area on the slider increases the stable range of electrostatic control, thereby providing increased control of the slider at lower fly heights.

DETAILED DESCRIPTION

Figure 1:
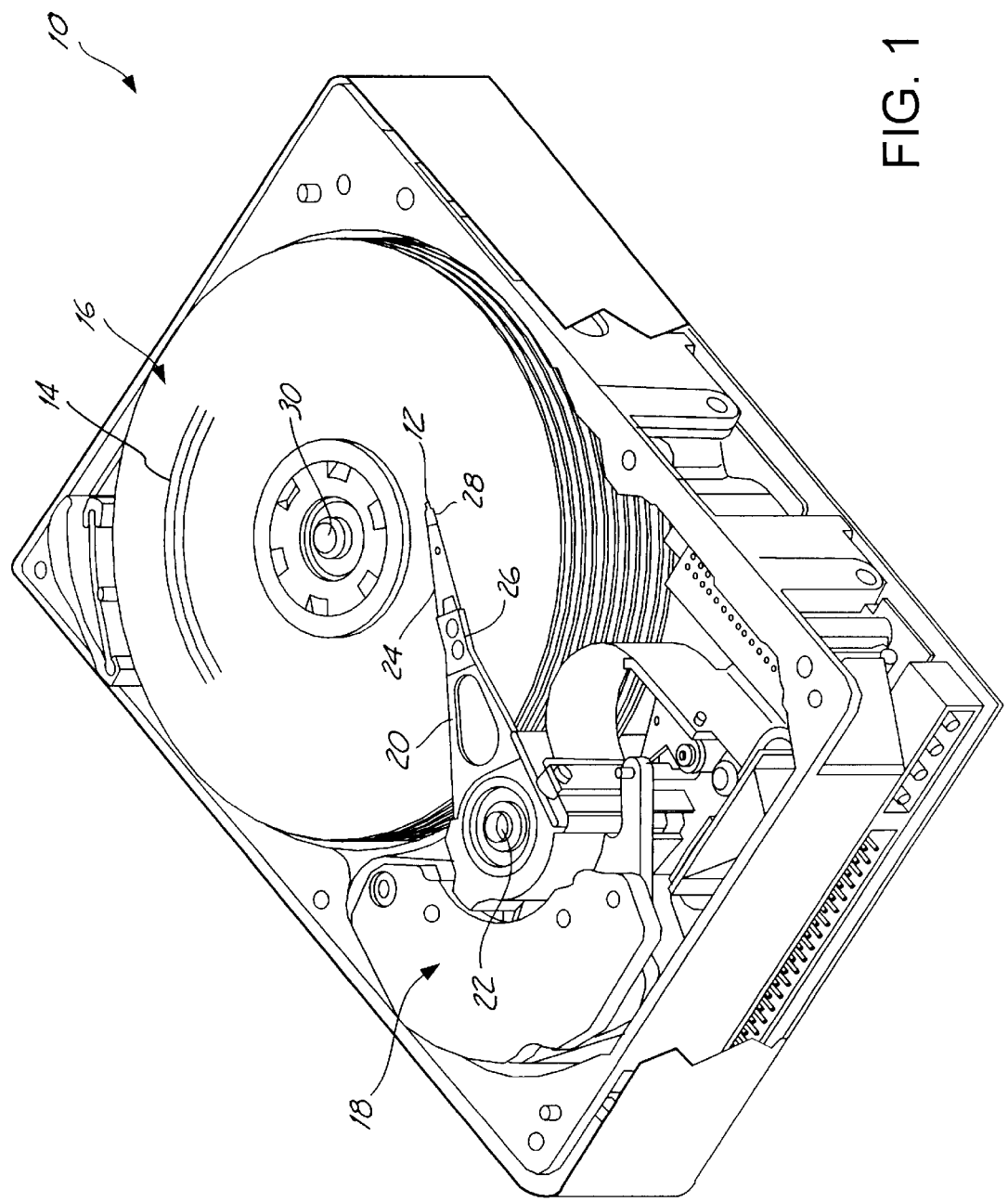
FIG. 1 is a perspective view of a disc drive system for positioning a slider over a track on a rotating disc.

FIG. 1 is a perspective view of a disc drive system 10 for positioning a slider 12 over a track 14 of a disc 16. The disc drive system 10 includes a voice coil motor 18 arranged to rotate an actuator arm 20 on a spindle around an axis 22. A load beam 24 is connected to the actuator arm 20 at a slider mounting block 26. A flexure 28 is connected to an end of the load beam 24 and carries a slider 12. The slider 12 carries a transducing head (not shown in FIG. 1) for reading and/or writing data on concentric tracks 14 of the disc 16.

As the disc 16 rotates, the disc 16 drags air in a direction approximately parallel to the tangential velocity of the disc 16. This windage creates a lift force, or an "air bearing", that allows the slider 12 to lift and "fly" a small distance above the disc 16 surface. The distance between the slider 12 and the rotating disc 16 is termed the "fly height". As the fly height of the portion of the slider 12 containing the transducing head (not shown in FIG. 1) is decreased, greater areal recording density is afforded.

The size of the air bearing force on the slider 12 influences fly height and is a function of the relative velocity between the rotating disc 16 and the slider 12. As the relative velocity between the rotating disc 16 and the slider 12 decreases, the air bearing force incident on the slider 12 decreases, thereby generating smaller fly height. Conversely, as the relative velocity between the rotating disc 16 and the slider 12 increases, the air bearing force incident on the slider 12 increases, thereby generating larger fly height.

Although fly height can be decreased by lessening the rotational speed of the disc 16 or by altering the aerodynamic properties of the slider 12, there remains a desire in the art to even further minimize fly height of the slider 12 and thereby afford greater areal recording density. One way to further decrease fly height is to apply a voltage to the slider 12 and electrostatically attract the slider 12 to the disc 16.

Figure 2:
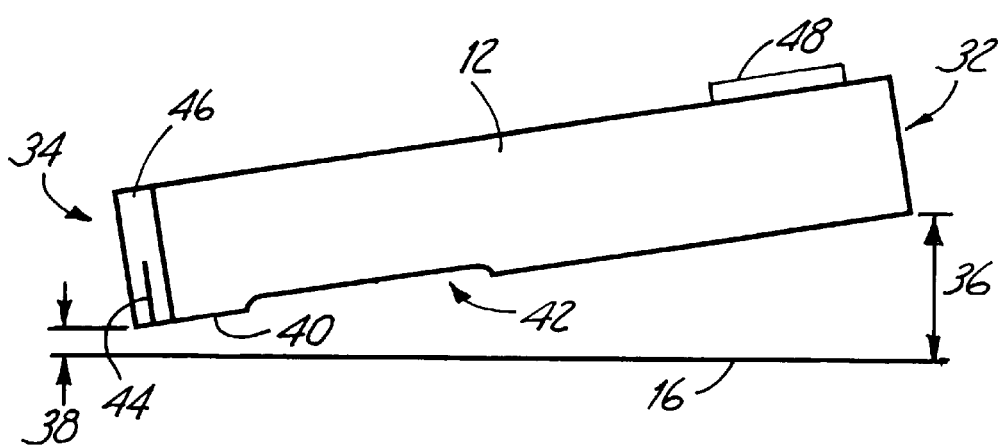
FIG. 2 is a side view of a slider positioned over a rotating disc in a disc drive system.

FIG. 2 is a side view of a portion of a disc drive system that includes a slider 12 capable of being electrostatically controlled. The slider 12 is positioned over a disc 16. The slider 12 is comprised of a leading edge 32; a trailing edge 34; a leading edge gap 36; a trailing edge gap 38; an actuation surface 40; a recessed area 42; a transducing head, the general location of which is indicated at 44; an insulating layer 46; and a connection 48 for applying voltage.

As the disc rotates beneath the slider, the leading edge 32 is the first part of the slider 12 to encounter windage created by the motion of the disc 16 relative to the slider 12. The trailing edge 34 is the last part of the slider 12 to encounter windage created by the motion of the disc 16 relative to the slider 12. The leading edge gap 36 refers to the distance the leading edge 32 flies above the disc 16. The trailing edge gap 38 refers to the distance the trailing edge 34 flies above the disc 16.

The actuation surface 40 and recessed area 42 are features of the air bearing surface of the slider 12 used to control the fly height of the slider 12. The actuation surface 40 is the portion of the air bearing surface, other than the transducing head 44 in the insulating layer 46, which is located closest to the disc 16. The recessed area 42 is located behind the actuation surface 40 (as viewed in FIG. 2). Along with the other features of the slider, the actuation surface 40 and recessed area 42 cause the slider to fly such that the trailing edge gap 38 is less than the leading edge gap 36.

As the disc 16 rotates, the transducing head, the general location of which is indicated by 44, is positioned close to the disc 16 to afford greater areal recording density. The transducing head 44 is contained in an insulating layer 46, located at the trailing edge 34 of the slider 12. The insulating layer 46 is formed of a dielectric material such as $Al_2O_3$ or $SiO_2$, and can act as part of, or the entire trailing edge 34. The insulating layer 46 protects the transducing head 44 from possible damaging effects of voltage applied to the slider 12.

To electrostatically control the slider 12, a voltage is applied to the slider at a voltage connection 48. Though shown on the top of the slider 12, the exact location of the connection may vary. Most sliders already contain connections used during testing. It is possible to use these testing connections as the voltage connection 48, thereby limiting manufacturing cost and increasing convenience.

As a voltage is applied to the slider 12 at the connection 48, an electrostatic attraction between the slider 12 and the disc 16 is created. The slider 12 must be made of a material that is at least somewhat conductive. Except for the insulating layer 46, sliders are typically constructed of conductive or semi-conductive material. Suitable materials for a slider capable of electrostatic control include silicon or an $Al_2O_3/TiC$ composite.

The electrostatic attractive force generated between the slider 12 and the disc 16 is a function of the applied voltage. As the applied voltage is increased, the electrostatic attractive force between the slider 12 and the disc 16 increases, thereby drawing the slider 12 closer to the disc 16 and decreasing fly height. Conversely, as the voltage is decreased, the attractive force between the slider 12 and the disc 16 decreases, thereby increasing fly height.

The majority of the electrostatic force generates at the portion of the slider 12 that is closest to the disc 16. Therefore, because the actuation surface 40 is closest to the disc 16 surface, the majority of electrostatic force generates at the actuation surface 40. As electrostatic forces bring the actuation surface 40 closer to the disc 16, the transducing head 40, located near the trailing edge 34 of the slider 12, is likewise positioned closer to the disc 16.

Figure 3:
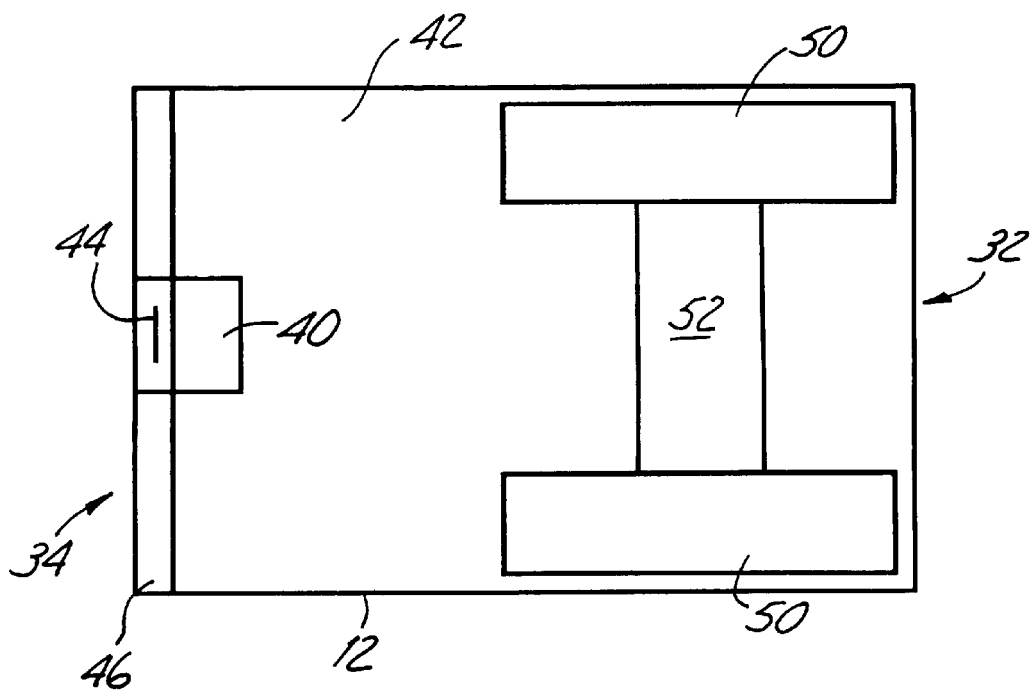
FIG. 3 is a bottom view of a slider illustrating the undercarriage of the slider.

FIG. 3 is a bottom view of a slider 12 illustrating the undercarriage of the slider 12. Shown once again are the leading edge 32, trailing edge 34, the location of the transducing head near the trailing edge 34 as indicated by 44, and the insulating layer 46. More clearly visible in FIG. 3 are features of the air bearing surface of the slider 12, including the actuation surface 40 and the recessed area 42. Also functioning as part of the air bearing surface are two rails 50 and a step 52.

As described above, when a voltage is applied to the slider 12, the majority of the electrostatic attractive force between the slider 12 and the disc (not shown in FIG. 3) generates at the actuation surface 40, located near the trailing edge 34. A relatively small amount of electrostatic attractive forces generate at other areas of the slider 12, such as the leading edge 32 or the recessed area 42.

The table set out below provides the distribution of electrostatic forces that generate on a typical pico slider designed for a 1.0 $\mu$in fly height, with 10 volts applied to the slider.

| Feature of Air Bearing Surface | Percent of Slider Area | Gap ($\mu$in) | Force (grams) |
| --- | --- | --- | --- |
| Trailing Edge | 1 | 0.025 | 0.91 |
| Leading Edge | 5 | 0.125 | 0.18 |
| Step | 20 | 0.3 | 0.13 |
| Recessed Area | 74 | 2.8 | 0.005 |

Applying the voltage creates an electrostatic attraction between the slider 12 and the disc 16. The majority of the electrostatic force occurs at the actuation surface 40 on the trailing edge 34. As a result of the electrostatic attraction at the actuation surface 40, the trailing edge gap 38 is reduced to 0.025 μin and the leading edge gap 36 becomes 0.125 μin. The voltage generates a force of 0.91 grams at the actuation surface 40, while only 0.18 grams of force will generate at the leading edge 32. At the step 52, the gap is 0.3 μin, which results in only 0.13 grams of force generating at the step 52. Similarly, at the recessed area 42, the gap is 2.8 μin, which results in only 0.005 grams of force generating at the recessed area 42.

The results given above demonstrate that as voltage is applied to the slider 12, the majority of electrostatic actuation occurs at the portion of the slider 12 located closest to the disc 16. The majority of electrostatic forces generate at the actuation surface 40 near the trailing edge 34, despite the fact that the actuation surface 40 makes up only 1% of the surface area of the air bearing side of the slider 12. In contrast, a relatively small amount of electrostatic force generates at the leading edge 32 and recessed area 42, which make up the remaining 5% and 74% of the area of the slider 12, respectively.

Figure 4:
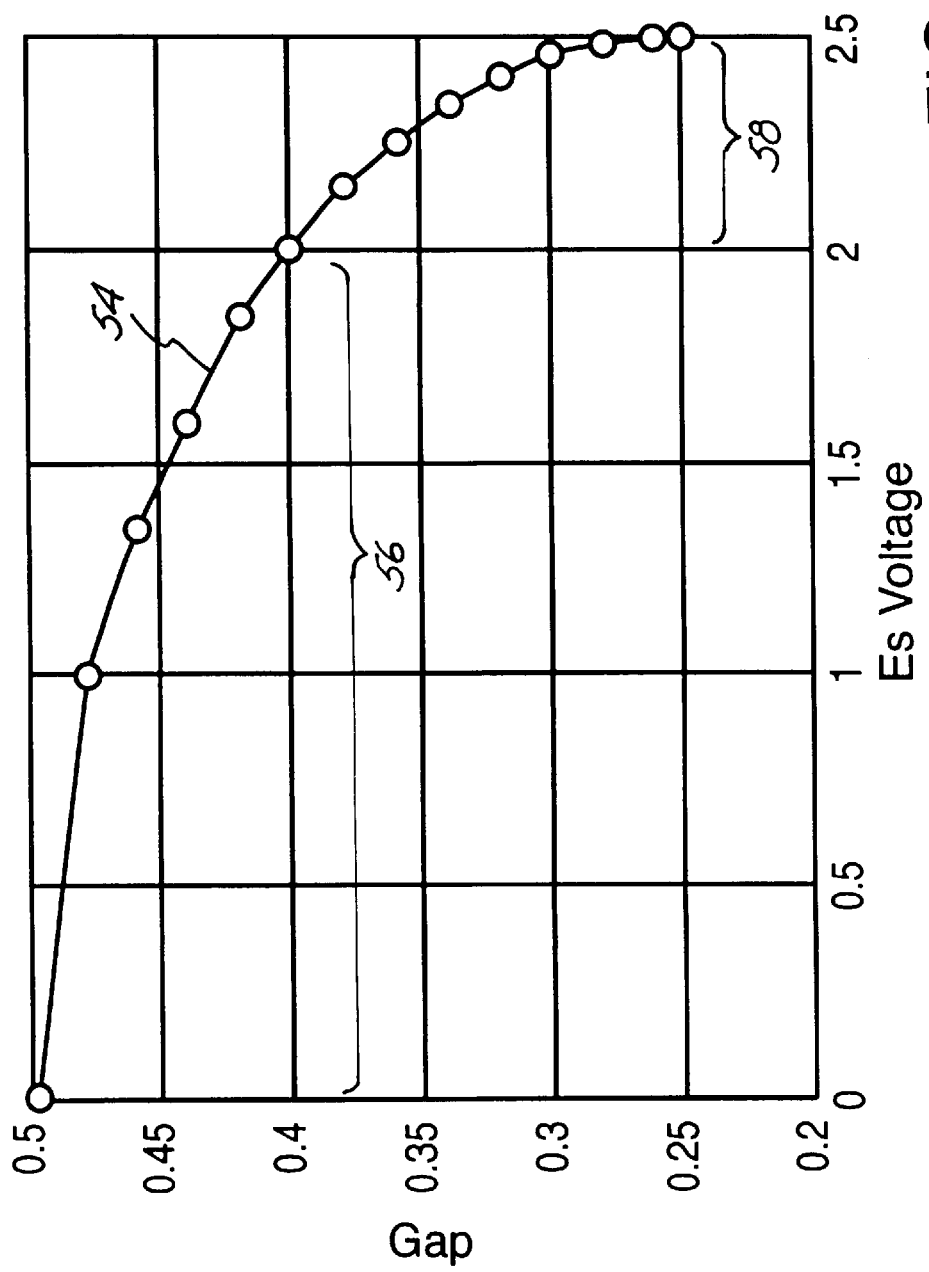
FIG. 4 is a graph depicting of fly height versus voltage for a typical slider in a disc drive system.

FIG. 4 is a graph depicting the results of a modeled attempt at electrostatic control of fly height for the slider 12 depicted in FIG. 2. When modeling, it was assumed that the air bearing force is inversely proportional to fly height, and that the nominal fly height of the slider (fly height without electrostatic control) is 0.5 μin. The vertical axis gives the trailing edge gap 38 in micro-inches. The horizontal axis is the voltage applied to the slider 12.

A curve 54 shown on FIG. 4 reflects the results of modeling the effects of electrostatic control on the slider 12. A first section 56 of the curve 52 demonstrates that as the applied voltage is increased to 2.0 V, the fly height can be decreased to 0.4 μin. A second section 58 of the curve 52 demonstrates that when the applied voltage is increased to 2.5V, fly height decreases to about 0.25 μin.

As can be seen from curve 54, the relationship between applied voltage and fly height is very non-linear. Toward the end of the first section 56, it becomes very difficult to control fly height. At just over 2.5 volts, as illustrated by the end of the second section 58, open loop control of the slider is lost and the slider snaps into contact with the disc.

Curve 54 illustrates graphically one reason why typical disc drive systems that employ electrostatic control of fly height encounter problems with instability. The air bearing forces on the slider 12 are proportional to the fly height. Therefore, as more voltage is applied to incrementally decrease fly height, the air bearing force on the slider 12 increases incrementally. However, the electrostatic forces between the slider 12 and the disc 16 are proportional to the square of the electrical field. As fly height is decreased, the electrostatic attractive force between the slider 12 and the disc 16 increases exponentially. As a result, at about 0.35 μin fly height at the trailing edge 34, the electrostatic attractive force becomes much stronger than the air bearing force and the slider 12 is in risk of crashing into the disc 16. The desired fly height continues to decrease, with pressure mounting for stable controllable fly heights at below 0.5 μin. Because of the instability at these low fly heights, electrostatic control has remained unavailable.

The present invention provides a slider and method of stable electrostatic control. The shape of the air bearing surface on the slider is modified to greatly improve ability to easily control the fly height of the slider. Specifically, by providing an increased gap between the actuation surface and the disc, the slider allows for electrostatic actuation to occur at a higher, more stable range; while still allowing the trailing edge of the slider to fly at the desired, lower fly heights.

Figure 5:
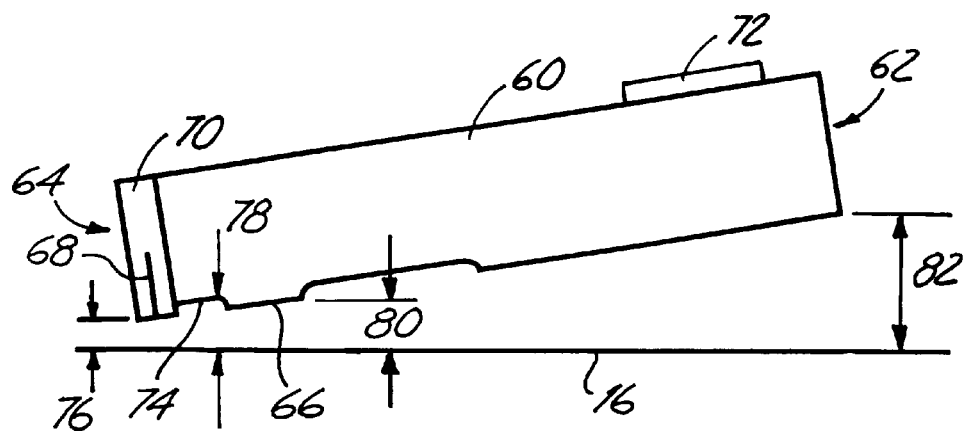
FIG. 5 is a side view of a slider having a recessed area between the slider's trailing edge and actuation surface.

FIG. 5 is a side view of a portion of a disc drive system that includes a slider 60 positioned over a disc 16. Similar to the slider 12 shown in FIG. 2, the slider 60 shown in FIG. 5 is comprised of a leading edge 62; a trailing edge 64; an actuation surface 66; a transducing head, the general location of which is indicated at 68; an insulating layer 70; and a connection 72 for applying voltage.

Unlike the slider 12 shown in FIG. 2, the slider 60 shown in FIG. 5 contains a recessed area 74, located between the trailing edge 64 and the actuation surface 66. FIG. 5 also delineates a trailing edge gap 76, a recessed area gap 78, an actuation surface gap 80, and a leading edge gap 82.

The recessed area 74 is a feature of the air bearing surface of the slider 60 and is used to control the fly height of the slider 60. The location and shape of the recessed area 74 also causes the majority of electrostatic attraction forces to generate at the actuation surface 66, located away from the trailing edge 64.

The trailing edge gap 76 refers to the distance that the trailing edge 64 flies above the surface of the disc 16. The recessed area gap 78 refers to the distance that the recessed area 74 flies above the surface of the disc 16. The actuation surface gap 80 refers to the distance that the actuation surface 66 flies above the surface of the disc 16. The leading edge gap 82 refers to the distance that the leading edge 62 flies above the surface of the disc 16. The recessed area 74 is preferably sized so that as the slider 60 flies above the disc, the actuation surface gap 80 is twice the nominal trailing edge gap 76.

As described above, applying a voltage to the slider 60 at the connection 72 causes an electrostatic attractive force between the slider 60 and the disc 16. As applied voltage is increased, the electrostatic attraction between the slider 60 and the disc 16 increases and the slider 60 is drawn closer to the disc 16.

As discussed earlier, the majority of the electrostatic attractive forces generate at the portion of the slider 60 located closest to the disc 16. Except for the trailing edge gap 76, the actuation surface gap 80 is much smaller than the gap at any other portion of the slider 60. Therefore, the majority of electrostatic attractive force generates at the actuation surface 66. The recessed area gap 78 and the leading edge gap 82 are much larger than the actuation surface gap 80, therefore minimal electrostatic forces generate at the recessed area 74 and the leading edge 62. Although the trailing edge 64 has the smallest gap 76, the insulating layer 70 serves to further reduce the electrostatic forces from generating at the trailing edge 64.

Figure 6:
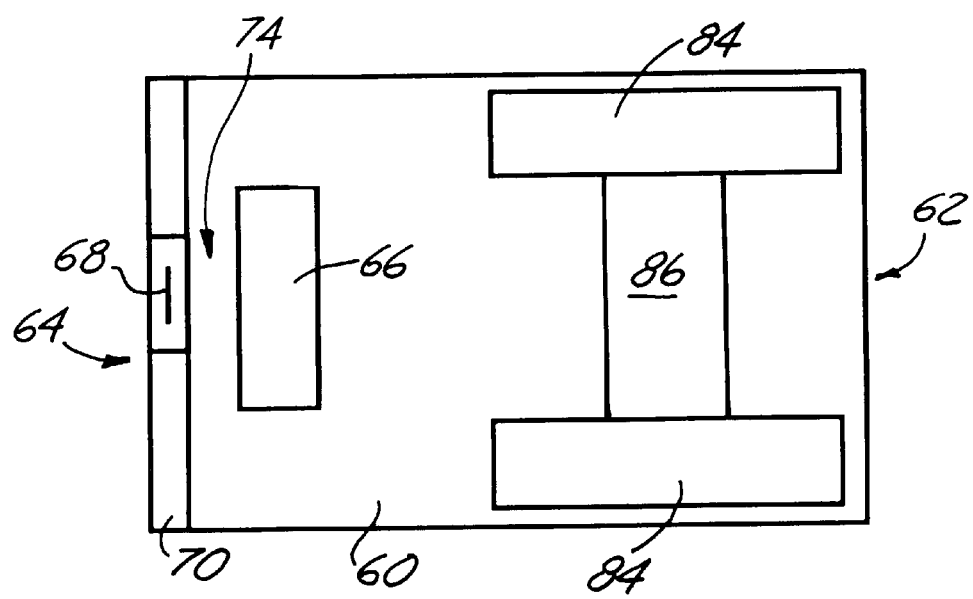
FIG. 6 is a bottom view of the slider having a recessed area between the slider's trailing edge and actuation surface.

FIG. 6 is a bottom view of the slider 60 depicted in FIG. 5. Shown once again are the leading edge 62, trailing edge 64, the general location of the transducing head 68, and the insulating layer 70. More clearly illustrated in FIG. 6 are features of the air bearing surface of the slider 60, including the actuation surface 66 and the recessed area 74. Also functioning as part of the air bearing surface are two rails 84 and a step 86.

The addition of the recessed area 74 results in the actuation surface 66 being moved up the body of the slider 60 (as shown on FIG. 6), away from the trailing edge 64. As described above, when a voltage is applied to the slider 12, the majority of the electrostatic attractive force between the slider 60 and the disc generates at the actuation surface 66, located away from the trailing edge 64. A relatively small amount of electrostatic attractive forces generate at other areas of the slider 60, such as the leading edge 62 or the recessed area 74.

The slider 60 design requires relatively few additional manufacturing process steps to construct. The slider 60 can be created by simply adding a recessed area 74 between the trailing edge 64 and the actuation surface 66 of the current slider 12 design, such as an ion milling process carried out at the wafer level. As such, construction of the slider 60 is convenient and only requires limited additional manufacturing cost.

Figure 7:
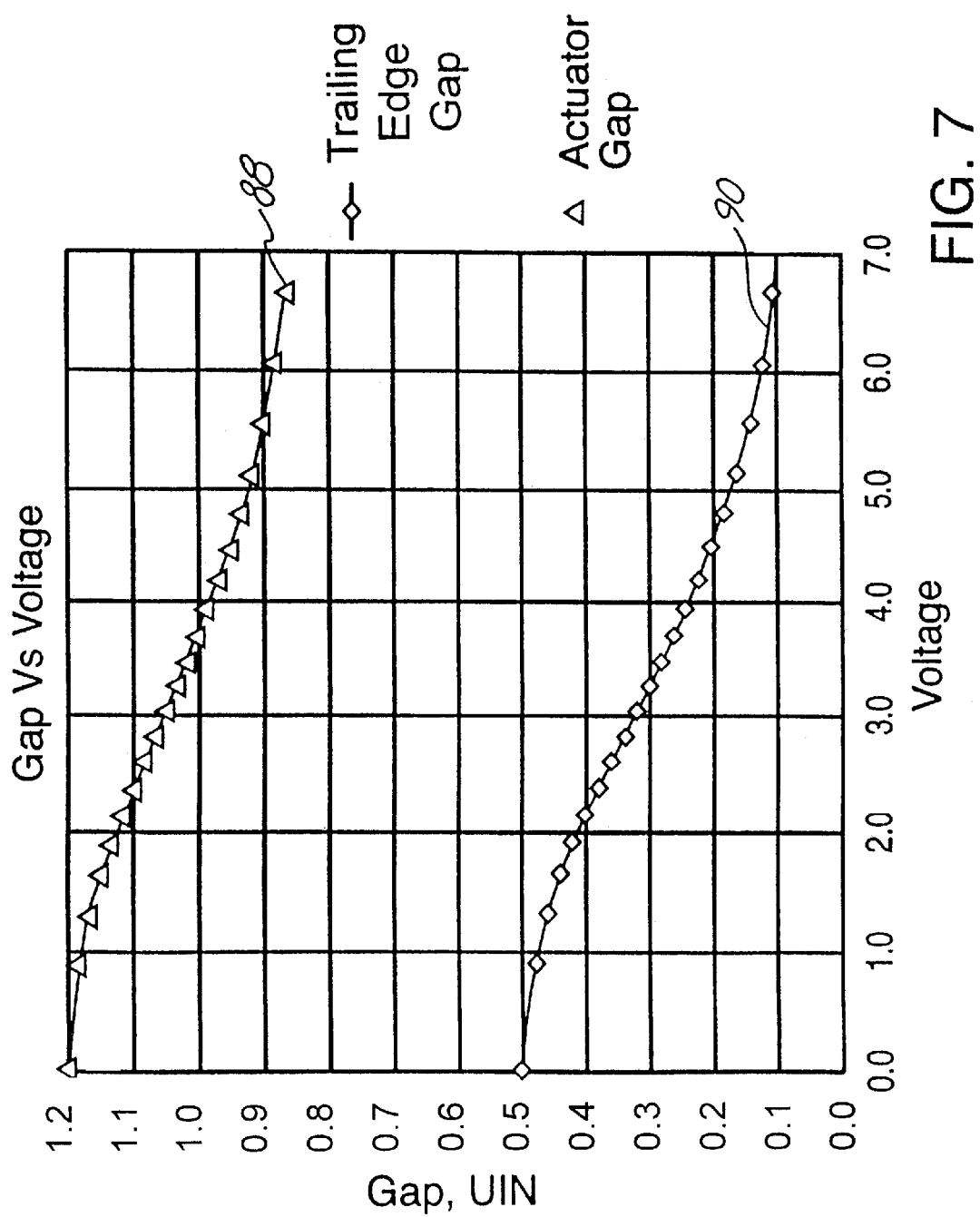
FIG. 7 is a graph depicting fly height versus voltage for a slider containing a recessed area between the slider's trailing edge and actuation surface.

FIG. 7 is a graphical depiction of electrostatic control of fly height for the slider 60 depicted in FIG. 5. The modeled graphical depiction assumes an actuation surface 66 of 200 by 300 $\mu$m; an insulating layer 70 made of $Al_2O_3$, which is 50 $\mu$m thick; and a 50 $\mu$m recess between the actuation surface 66 and the trailing edge 64. The model also assumes a 2.5 gram preload force from a load beam 24, with 1.25 grams of the preload force on the trailing edge 64; a 0.5 $\mu$in nominal fly height; and a fly height inversely proportional to the air bearing force.

The vertical axis is the gap between the slider 60 and the disc 16 in micro-inches. The horizontal axis is the voltage applied to the slider 60. A curve 88 indicates the actuation surface gap 80 as voltage is applied to the slider 60. A curve 90 indicates the trailing edge gap 76 as voltage is applied to the slider 60.

Curve 88 demonstrates that as applied voltage increases to 6.0 volts, the actuation surface gap 80 decreases in a nearly linear fashion to about 0.9 $\mu$in. The nearly linear relationship between voltage and fly height depicted in Curve 88 indicates that as applied voltage is increased and electrostatic forces attract the slider 60 closer to the disc 16, a stable range of actuation is maintained. Curve 90 demonstrates that as applied voltage increases to 6.0 volts, the trailing edge gap 76 decreases in a nearly linear fashion to about 0.1 $\mu$in.

The parallel nature of curve 88 and curve 90 demonstrates that by providing a stable range of actuation at the actuation surface gap 80, fly height at the trailing edge 64 can simultaneously be minimized and controlled to much smaller values than possible before. For example, applying a voltage to the slider causes just a 29% reduction in the actuation surface gap 80 (from 1.2 $\mu$in to 0.85 $\mu$in). At the same time, the applied voltage results in an 80% reduction in trailing edge gap 76 (from 0.5 $\mu$in to 0.1 $\mu$in).

Therefore, by adding a recessed area 74 to the slider 60 between the trailing edge and the actuation surface 66, electrostatic actuation is performed at a range where open loop control remains stable. As such, the slider 60 allows for stable electrostatic control at much lower fly heights, thereby providing increased areal recording density and increasing performance of the disc drive system.

Although the present invention has been described with reference to preferred embodiments, workers skilled in the art will recognize that changes may be made in form and detail without departing from the spirit and scope of the invention.

What is claimed is:

1. A disc drive comprising:
   a slider positioned relative to a disc at a fly height; and
   means for electrostatically controlling the fly height of the slider.

2. The disc drive of claim 1 wherein the slider comprises:
   a leading edge and a trailing edge;
   an air bearing surface located proximate the disc;
   a conductive actuation surface located on the air bearing surface; and
   a recessed area located on the air bearing surface, wherein the recessed area is between the trailing edge and the actuation surface.

3. The slider of claim 2 and further comprising a connection for applying a voltage to the slider to create an electrostatic attraction between the slider and the disc.

4. The slider of claim 3 wherein the recessed area is sized so that an application of a voltage to the slider allows for linear electrostatic control of the fly height of the slider.

5. The slider of claim 4 wherein the actuation surface is located relative to the recessed area so that the application of a voltage to the slider allows for linear electrostatic control of the fly height of the slider.

6. The slider of claim 3 wherein the slider is formed of a conductive material.

7. The slider of claim 6 wherein the trailing edge of the slider comprises an insulating layer.

8. The slider of claim 2 wherein the recessed area is sized so that as the slider flies above the disc surface a gap between the actuation surface and the disc surface is greater than the gap between the trailing edge surface and the disc surface.

9. The slider of claim 8 wherein the recessed area is sized so that as the slider flies above the disc the gap between the actuation surface and the disc surface is less than the gap between the recessed area and the disc surface.

10. The slider of claim 2 wherein the recessed area is sized so that as the slider flies above the disc a gap between the actuation surface and the disc surface is between about 1.5 to about 3 times a gap between the trailing edge surface and the disc surface.

11. A slider configured for electrostatic control, the slider comprising:
    a recessed area on an air bearing surface of the slider; and
    a conductive actuation surface located proximate the recessed area.

12. The slider of claim 11 wherein the slider further comprises a trailing edge and the recessed area is located between the trailing edge and the actuation surface.

13. The slider of claim 12 and further comprising a connection for applying a voltage to the slider.

14. The slider of claim 13 wherein the recessed area is sized so that an application of between about 2 and about 4 volts to the slider allows for linear electrostatic control of the fly height of the slider.

15. The slider of claim 13 wherein the actuation surface is located relative to the recessed area so that an application of between about 2 and about 4 volts to the slider allows for linear electrostatic control of the fly height of the slider.

16. The slider of claim 11 wherein the recessed area is sized so that as the slider flies above a disc a gap between the actuation surface and a disc surface is less than a gap between the recessed area and the disc surface.

17. The slider of claim 16 wherein the recessed area is sized so that as the slider flies above a disc the gap between the actuation surface and the disc surface is greater than a gap between a trailing edge surface of the slider and disc surface.

18. The slider of claim 12 wherein the recessed area is sized so that as the slider flies above a disc a gap between the actuation surface and a disc surface is twice a gap between a trailing edge surface and the disc surface.

19. A method of affecting a fly height of a slider having an actuation surface and a recessed area between a trailing edge of the slider and the actuation surface, the method comprising:
    rotating a disc to fly the slider above a surface of the disc on an air bearing;

creating an electrostatic attraction between the slider and the disc so that a majority of the electrostatic attraction occurs at the actuation surface; and affecting fly height of the slider by controlling the electrostatic attraction between the actuation surface and the disc, wherein creating the electrostatic attraction between the slider and the disc comprises applying a voltage to the slider based on a linear relationship between the applied voltage and an electrostatic attraction between the actuation surface and the disc surface.

20. The method of claim 19 and further comprising controlling a gap between a trailing edge of the slider and the disc surface based on a relationship between the actuation surface gap and the trailing edge gap.

21. A method of affecting a fly height of a slider having an actuation surface and a recessed area between a trailing edge of the slider and the actuation surface, the method comprising:

rotating a disc to fly the slider above a surface of the disc on an air bearing;

creating an electrostatic attraction between the slider and the disc so that a majority of the electrostatic attraction occurs at the actuation surface; and affecting fly height of the slider by controlling the electrostatic attraction between the actuation surface and the disc, wherein controlling the electrostatic attraction between the actuation surface and the disc comprises applying a voltage between about 2 and about 4 volts to the slider to allow for linear control of the gap between the actuation surface and the disc surface.

22. A method of affecting a fly height of a slider having an actuation surface and a recessed area between a trailing edge of the slider and the actuation surface, the method comprising:

rotating a disc to fly the slider above a surface of the disc on an air bearing;

providing an insulation layer at a trailing edge of the slider;

creating an electrostatic attraction between the slider and the disc so that a majority of the electrostatic attraction occurs at the actuation surface; and affecting fly height of the slider by controlling the electrostatic attraction between the actuation surface and the disc.

* * * * *